United States Patent
Escobar

(10) Patent No.: US 11,318,502 B2
(45) Date of Patent: May 3, 2022

(54) POWERWASH TEST FOR SPEAKERS

(71) Applicant: Honda Motor Co., Ltd., Tokyo (JP)

(72) Inventor: Edgar Arturo Escobar, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 305 days.

(21) Appl. No.: 16/833,120

(22) Filed: Mar. 27, 2020

(65) Prior Publication Data

US 2021/0299707 A1 Sep. 30, 2021

(51) Int. Cl.
*B08B 3/02* (2006.01)
*B08B 13/00* (2006.01)
*H04R 1/02* (2006.01)
*G01L 5/00* (2006.01)

(52) U.S. Cl.
CPC ............. *B08B 3/02* (2013.01); *B08B 13/00* (2013.01); *G01L 5/0052* (2013.01); *H04R 1/023* (2013.01)

(58) Field of Classification Search
CPC ........ H04R 1/023; H04R 1/28; H04R 29/001; H04R 2499/10; B08B 3/02; B08B 3/26; B08B 13/00
See application file for complete search history.

(56) References Cited

FOREIGN PATENT DOCUMENTS

DE   1993320 A1 * 2/2001 ............. B08B 3/026

* cited by examiner

*Primary Examiner* — Sunita Joshi
(74) *Attorney, Agent, or Firm* — Suzanne Gagnon; American Honda Motor Co., Inc.

(57) ABSTRACT

A test apparatus is provided. The test apparatus includes a fluid release mechanism having a nozzle. The test apparatus furthers include a pressure plate coupled to a pressure sensor and a grille mounting plate disposed between the nozzle and the pressure plate. The grille mounting plate is disposed at a first distance from the pressure plate and a second distance from the nozzle. When activated, the fluid release mechanism releases a cleaning fluid at a first pressure through the nozzle and towards a first speaker grille mounted on the grille mounting plate. The first speaker grille includes a first hole pattern which diffuses the released cleaning fluid, causing the diffused cleaning fluid to strike the pressure plate at a second pressure. The pressure sensor records the second pressure when the diffused cleaning fluid strikes the pressure plate.

20 Claims, 6 Drawing Sheets

POWERWASH TEST FOR SPEAKERS

BACKGROUND

Speakers, especially ones used in harsh environments, accumulate dirt over time. For example, speakers in off-road vehicles or in vehicles designed for power-sports application (e.g., Side-by-Side (SXS), All-Terrain-Vehicle (ATV), etc.) may accumulate more dirt as these vehicles often operate in off-road regions and lack a suitable enclosure for protection against accumulation of dust particles. These dust particles may typically accumulate on a speaker grille or in spaces between the speaker grille and a speaker driver covered by the speaker grille. Such accumulation may affect sound quality of the speaker or may even reduce the life of electronic and mechanical components of the speaker.

SUMMARY

An exemplary aspect of the disclosure provides a method to conduct a power-wash test for a speaker driver. The method may include placing a test apparatus which may include a fluid release mechanism with a nozzle. The test apparatus may further include a pressure plate coupled to a pressure sensor and a grille mounting plate disposed between the nozzle and the pressure plate. The method may further include mounting a first speaker grille having a first hole pattern on the grille mounting plate and adjusting a first distance between the grille mounting plate and the pressure plate. The method may further include adjusting a second distance between the grille mounting plate and the nozzle and activating the fluid release mechanism to release a cleaning fluid at a first pressure through the nozzle and towards the first speaker grille. The first hole pattern may diffuse the released cleaning fluid, causing the diffused cleaning fluid to strike the pressure plate at a second pressure. The method may further include recording, using the pressure sensor, the second pressure at which the diffused cleaning fluid may strike the pressure plate.

Another exemplary aspect of the disclosure provides a test apparatus for a speaker driver. The test apparatus may include a fluid release mechanism with a nozzle. The test apparatus may further include a pressure plate coupled to a pressure sensor and a grille mounting plate disposed between the nozzle and the pressure plate. The grille mounting plate may be disposed at a first distance from the pressure plate and a second distance from the nozzle. When activated, the fluid release mechanism may be configured to release a cleaning fluid at a first pressure through the nozzle and towards a first speaker grille mounted on the grille mounting plate. The first speaker grille may include a first hole pattern which may diffuse the released cleaning fluid, causing the diffused cleaning fluid to strike the pressure plate at a second pressure. The pressure sensor may be configured to record the second pressure when the diffused cleaning fluid strikes the pressure plate.

This summary is provided to introduce a selection of concepts in a simplified form that are further disclosed in the detailed description of the present disclosure. This summary is not intended to identify key or essential inventive concepts of the claimed subject matter, nor is it intended for determining the scope of the claimed subject matter.

Figure 1:
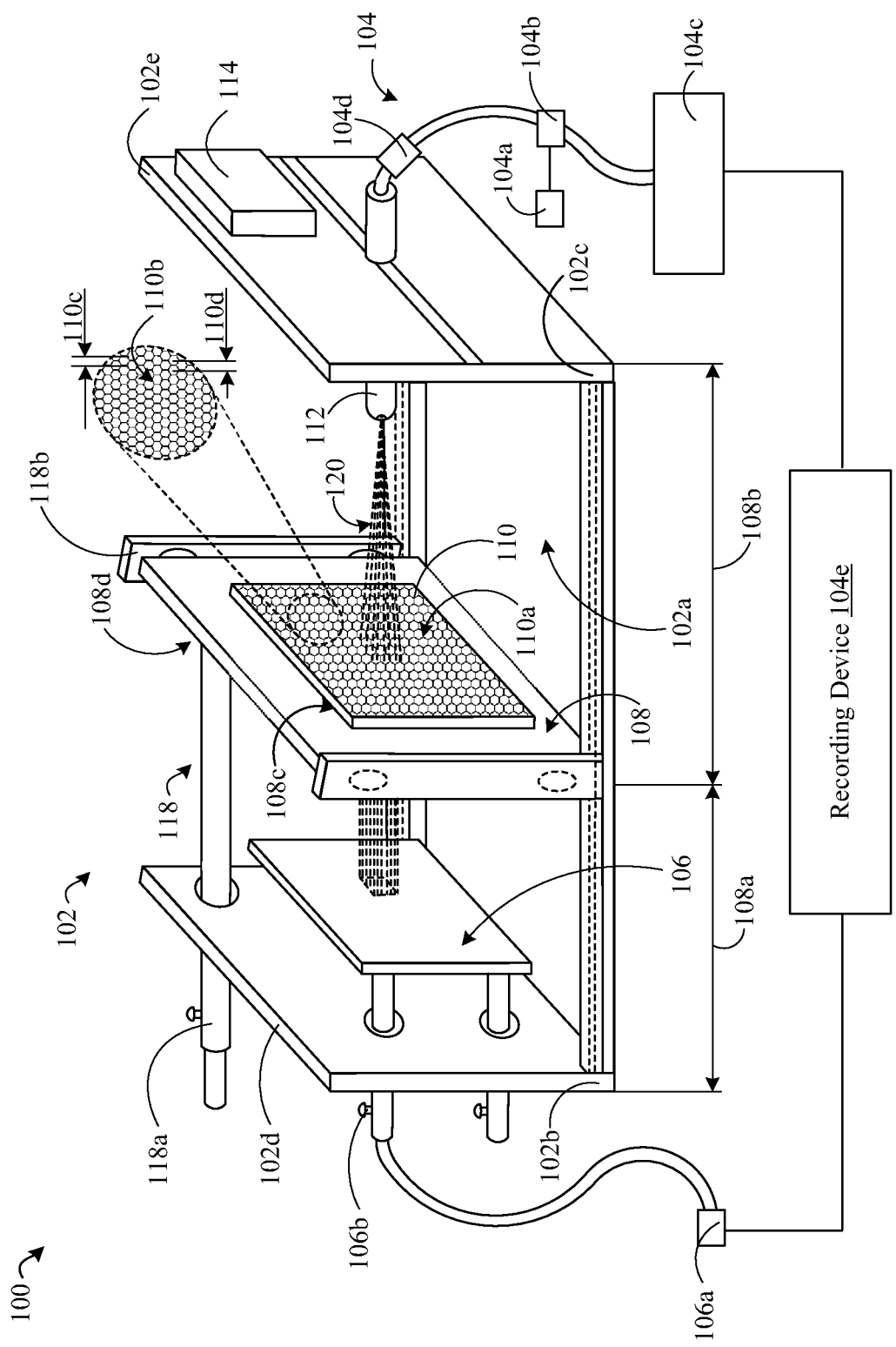
FIG. 1 is a diagram that illustrates a perspective view of an exemplary test apparatus, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may provide a test apparatus to test a suitability of speaker grilles in offering protection to a speaker driver during a power wash of a speaker. If a speaker is subjected to a power wash, the cleaning fluid from the power washing nozzle may damage the speaker driver. In order to avoid such a damage, the present disclosure provides a method to test a suitability of speaker grilles in offering protection to the speaker driver during a power wash of the speaker. Each speaker grille may include a different hole pattern, which may be characterized by a unique hole size and/or a unique center-to-center spacing between two neighboring holes of a respective speaker grille. The test apparatus may be used to develop passing specifications for various speaker grilles. These passing specifications may include optimal speaker grille to speaker driver spacings and speaker to power wash nozzle spacings for various speaker grilles. Information in the passing specifications may help an operator to select a suitable speaker grille for a speaker driver and a suitable arrangement of the selected speaker grille and the speaker driver for a power washing application. During a power wash, the speaker driver may be arranged with the speaker grille in an optimal arrangement to ensure that the pressure of the cleaning fluid (as released from the power washing nozzle) does not damage the speaker driver when the cleaning fluid diffuses through the speaker grille to strike the face of the speaker driver.

Reference will now be made in detail to specific aspects or features, examples of which are illustrated in the accompanying drawings. Wherever possible, corresponding or similar reference numbers will be used throughout the drawings to refer to the same or corresponding parts.

FIG. 1 is a diagram that illustrates a perspective view of an exemplary test apparatus, in accordance with an embodiment of the disclosure. With reference to FIG. 1, there is shown a diagram 100 of a test apparatus 102. The test apparatus 102 may include a base 102a, a fluid release mechanism 104, a pressure plate 106, and a grille mounting plate 108 which may be configured to hold a first speaker grille 110. The test apparatus 102 may be used to test a suitability of the first speaker grille 110 in offering protection to a speaker driver of a speaker when the speaker is subjected to a power wash.

The base 102a of the test apparatus 102 may have a first end 102b and a second end 102c. The base 102a may have a substantially rectangular structure and may be configured to support components, such as the fluid release mechanism 104, the pressure plate 106, and the grille mounting plate 108. In an embodiment, the base 102a may include a first wall 102d and a second wall 102e. The first wall 102d may extend substantially perpendicular from the first end 102b of the base 102a. Similarly, the second wall 102e may extend substantially perpendicular from the second end 102c of the base 102a such that the second wall 102e is substantially parallel to the first wall 102d. In an embodiment, the first wall 102d may be configured to hold the pressure plate 106 and the second wall 102e may be configured to hold a nozzle 112 of the fluid release mechanism 104. In another embodiment, the base 102a may not include the second wall 102e. In such an implementation, the nozzle 112 may be disposed on a separate guide rail (not shown) that may control the movement and position of the nozzle 112 of the fluid release mechanism 104.

Figure 3:
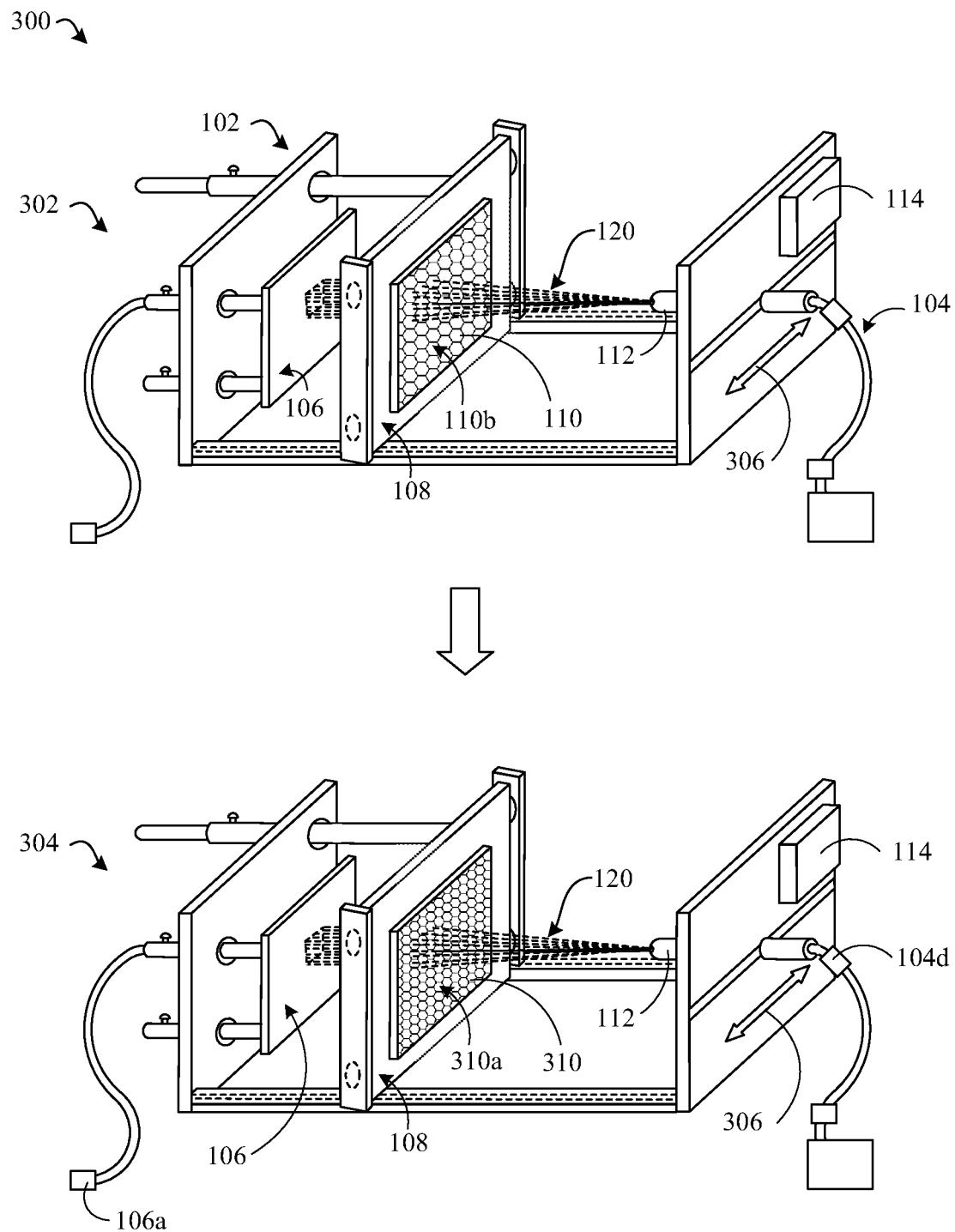
FIG. 3 is a diagram that illustrates exemplary stages of operations for a power-wash test of a speaker grille using the exemplary test apparatus of FIG. 1, in accordance with an embodiment of the disclosure.

The fluid release mechanism 104 may be configured to release a cleaning fluid 120 onto the first speaker grille 110 (as shown in FIG. 3). For example, the fluid release mechanism 104 may be a pressure washing device (such as, a power-wash cleaner) that may be configured to release a water spray as the cleaning fluid 120 on to the first speaker grille 110. The fluid release mechanism 104 may include an actuator 104a, a pump 104b, a fluid reservoir 104c, a pressure gauge 104d, and the nozzle 112.

The actuator 104a may be configured to control the release of the cleaning fluid 120 towards the nozzle 112 either through a mechanical release system or an electronic release system. In one example, if the actuator 104a includes the mechanical release system, the fluid release mechanism 104 may be configured to control the flow of the cleaning fluid 120 towards the nozzle 112 through a mechanical flow control valve (not shown). The mechanical flow control valve may control the release of the cleaning fluid 120 through the nozzle 112 based on a manual control by a human operator. Examples of the mechanical flow control valve may include, but are not limited to, a ball valve, a butterfly valve, a check valve, a gate valve, and a globe valve. In another example, if the actuator 104a includes the electronic release system, the fluid release mechanism 104 may be configured to control the flow of the cleaning fluid 120 towards the nozzle 112 through an electronic flow control valve (not shown). The electronic flow control valve may control the release of the cleaning fluid 120 through the nozzle 112 based on instructions/control signals received from an electronic controller (for example, a Programmable Logic Controller). Examples of such an electronic flow control valve may include, but are not limited to, a direct-acting solenoid valve, a pilot-operated solenoid valve, or a proportional control solenoid valve.

In an embodiment, the actuator 104a of the fluid release mechanism 104 may be configured to control a fluid pressure, a fluid volume, a fluid velocity, or a combination thereof of the cleaning fluid 120. For example, the fluid pressure may be controlled in PSI (i.e., in Pounds of force per Square Inch of area) between 1000 PSI and 3000 PSI and the fluid volume may be controlled in GPM (i.e., in Gallons per Minute) between 1 GPM and 2 GPM. The actuator 104a may control the pump 104b of the fluid release mechanism 104 to release the cleaning fluid 120 through the nozzle 112.

The pump 104b may be configured to draw the cleaning fluid 120 from the fluid reservoir 104c and release the cleaning fluid 120 through the nozzle 112 towards the first speaker grille 110 mounted on the grille mounting plate 108. Examples of the pump 104b may include, but are not limited to, a positive displacement pump, a centrifugal pump, or an axial-flow pump. While pumping the cleaning fluid 120 through the pump 104b towards the nozzle 112, the cleaning fluid 120 may pass through the pressure gauge 104d that may be coupled adjacent to the nozzle 112. The pressure gauge 104d may be configured to determine a pressure of the cleaning fluid 120 as it may pass through the nozzle 112. When activated, the fluid release mechanism 104 may be configured to release the cleaning fluid 120 at a first pressure through the nozzle 112. For example, when the actuator 104a actuates the pump 104b through the mechanical release system or the electronic release system, the pump 104b may be configured to release the cleaning fluid 120 at the first pressure through the nozzle 112. For a power-wash test, a human operator may record the first pressure using the pressure gauge 104d. Additionally, or alternatively, a recording device 104e may be used to record the first pressure at which the cleaning fluid 120 may be released through the nozzle 112. Examples of the recording device 104e may include, but are not limited to, a computer, a data logger, a smartphone, or a workstation.

The nozzle 112 of the fluid release mechanism 104 may have a suitable structure and design that may be configured to release the cleaning fluid 120 towards the first speaker grille 110. In an embodiment, the nozzle 112 of the fluid release mechanism 104 may be disposed substantially perpendicular to the grille mounting plate 108. Alternatively, the nozzle 112 may be disposed at an inclined configuration (not shown) to the grille mounting plate 108. The nozzle 112 may include a nozzle tip that may be configured to release the cleaning fluid 120. In FIG. 1, the nozzle 112 is shown as a unitary nozzle with a single nozzle tip to release the cleaning fluid 120. It should be noted that the nozzle 112, as shown in FIG. 1, is presented merely as an example. The present disclosure may be also applicable to other types of nozzles, such as, but not limited to, a group of nozzles with multiple nozzle tips, or a single nozzle with a selectively interchangeable nozzle tip, or a swiveling nozzle with multiple rotating nozzle tips.

In an embodiment, the nozzle 112 may be configured to control a spray pattern of the cleaning fluid 120 based on an angular configuration of the nozzle tip of the nozzle 112. For example, if the nozzle tip of the nozzle 112 is set at a 0 degree, the nozzle 112 may release the cleaning fluid 120 as a direct jet of cleaning fluid towards the grille mounting plate 108. If the nozzle tip of the nozzle 112 is set at an angle that is higher than 0 degree (for example, between 5 degrees and 70 degrees), the nozzle 112 may release the cleaning fluid 120 as the spray pattern towards the grille mounting plate 108. The spray pattern of nozzle 112 may be one of a fan-shaped spray pattern or a sheet-shaped spray pattern.

The nozzle 112 may also be configured to control the fluid pressure of the cleaning fluid 120 based on the angular configuration of the nozzle tip of the nozzle 112. For example, if the nozzle tip is set at 15 degrees, the cleaning fluid 120 may be sprayed from the nozzle 112 with a spray pattern that has a maximum pressure. In case the nozzle tip of the nozzle 112 is set at 65 degrees, the cleaning fluid 120 may be sprayed from the nozzle 112 with a spray pattern that has a minimal pressure. In one embodiment, the nozzle 112 of the fluid release mechanism 104 may be configured to be coupled with a gantry 114. The gantry 114 may be disposed substantially parallel to the grille mounting plate 108 and may slidably couple the nozzle 112 to the second wall 102e of the base 102a. When activated, the gantry 114 may be configured to reciprocally slide the nozzle 112 along the second wall 102e at a first speed along a direction 306 (as shown in FIG. 3). In an embodiment, the gantry 114 may be configured to reciprocally slide the nozzle 112 in a horizontal direction. In another embodiment, the gantry 114 may be configured to reciprocally slide the nozzle 112 in a vertical direction. Such a sliding movement of nozzle 112 may facilitate the release of the cleaning fluid 120 to strike multiple regions or an entire area 110a of the first speaker grille 110 mounted on the grille mounting plate 108. As one example, the gantry 114 may include a rack and pinion arrangement (not shown) that may reciprocally slide the nozzle 112 to release the cleaning fluid 120 over the entire area 110a of the first speaker grille 110 during a power-wash test.

In one embodiment, the fluid release mechanism 104 device may also include an internal heater (not shown) so that the fluid release mechanism 104 may be configured to optionally heat the cleaning fluid 120. Additionally, or alternatively, the fluid release mechanism 104 may be coupled with a tank of a cleaning agent (not shown) so that the fluid release mechanism 104 may mix the cleaning agent with the cleaning fluid 120 and spray the mix of the cleaning agent and the cleaning fluid 120 onto the pressure plate 106, through the nozzle 112.

The pressure plate 106 may have a suitable structure and design that may be configured to receive the cleaning fluid 120 which may have diffused through the first speaker grille 110. The diffused cleaning fluid 120 may strike the pressure plate 106 at a second pressure. The pressure plate 106 may be coupled to a pressure sensor 106a to record the second pressure at which the diffused cleaning fluid 120 strikes the pressure plate 106. The recorded second pressure may be less than the first pressure at which the cleaning fluid 120 is released through the nozzle 112 onto the first speaker grille 110. For example, when the actuator 104a activates the pump 104b, the cleaning fluid 120 may be released at the first pressure from the nozzle 112 towards the grille mounting plate 108. The released cleaning fluid 120 may diffuse through the first speaker grille 110 and the diffused cleaning fluid 120 may strike the pressure plate 106 at the second pressure. The pressure sensor 106a coupled to the pressure plate 106 may then record the second pressure. Examples of the pressure sensor 106a may include, but are not limited to, a load sensor, a piezo-electric transducer, piezo-resistive strain gauge, or an electronic pressure transducer which uses a force collector, such a diaphragm, piston, bourdon tube, or bellows to measure strain (or deflection) due to a pressure on the pressure plate 106.

In an embodiment, the pressure plate 106 may be disposed substantially parallel to the grille mounting plate 108 and firmly affixed to the first wall 102d through a fastening element 106b. In FIG. 1, the pressure plate 106 is shown to have a substantially rectangular structure that matches to a size of the first speaker grille 110 to effectively capture the diffused cleaning fluid 120. However, the present disclosure may not be so limiting and may be applicable to other structures of the pressure plate 106, without departing from the scope of the disclosure.

The grille mounting plate 108 may have a suitable structure and design that may be configured to hold the first speaker grille 110. The grille mounting plate 108 may be disposed between the nozzle 112 and the pressure plate 106 at a first distance 108a from the pressure plate 106 and at a second distance 108b from the nozzle 112. At the first distance 108a from the pressure plate 106, the grille mounting plate 108 may be disposed substantially parallel to the pressure plate 106. Similarly, at the second distance 108b from the nozzle 112, the grill mounting plate 108 may be disposed substantially perpendicular to the nozzle 112 of the fluid release mechanism 104.

In an embodiment, the grille mounting plate 108 may include a grille cut-out 108c which may be configured to accommodate the first speaker grille 110. In FIG. 1, the grille mounting plate 108 and the grille cut-out 108c are shown to have a substantially rectangular structure. However, the present disclosure may not be so limiting and may be applicable to other structures of the grille mounting plate 108 and grille cut-out 108c to accommodate variations in a structure of the first speaker grille 110. For example, in case the first speaker grille 110 has a substantially circular structure, the grille mounting plate 108 and/or the grille cut-out 108c may also have a substantially circular structure to match the structure of the first speaker grille 110.

In an embodiment, the grille mounting plate 108 may include an end 108d that may be configured to hold an adjustable support structure 118. The adjustable support structure 118 may have a suitable structure and design that may be configured to adjust a position 208 and a relative orientation 210 (shown in FIG. 2) of the grille mounting plate 108. In an embodiment, the first wall 102d of the base 102a may be configured to hold the adjustable support structure 118 that may be coupled to the end 108d of the grille mounting plate 108.

The adjustable support structure 118 may include a distance-adjustment mechanism 118a and an angle-adjustment mechanism 118b. The distance-adjustment mechanism 118a may have a suitable structure and design that may be configured to set the first distance 108a between the grille mounting plate 108 and the pressure plate 106. Also, the distance-adjustment mechanism 118a may be configured to set the second distance 108b between the grille mounting plate 108 and the nozzle 112. Using the distance-adjustment mechanism 118a, the first distance 108a and the second distance 108b may be adjusted to calibrate the second pressure at which the diffused cleaning fluid 120 may strike the pressure plate 106. This may be performed to ensure that the second pressure is less than or equal to a threshold pressure. Herein, the threshold pressure may be a maximum permissible pressure of the diffused cleaning fluid 120 for a power-wash of the speaker (or the speaker driver).

The angle-adjustment mechanism 118b may have a suitable structure and design that may be configured to set the relative orientation 210 of the grille mounting plate 108 with the pressure plate 106. Further, the angle-adjustment mechanism 118b may be configured to set the relative orientation 210 of the grill mounting plate 108 with the nozzle 112. As the first speaker grille 110 is fixedly mounted on the grille mounting plate 108, the change in relative orientation 210 of the grille mounting plate 108 may also change the relative orientation 210 of the first speaker grille 110. Using the angle-adjustment mechanism 118b, the relative orientation 210 may be adjusted to calibrate the second pressure at which the diffused cleaning fluid 120 strikes the pressure plate 106 and to ensure that the second pressure remains less than or equal to the threshold pressure.

The first speaker grille 110 may have a suitable structure and design that may be configured to be securely cover a face of the speaker driver. In FIG. 1, the first speaker grille 110 is shown to have a substantially rectangular structure. However, the present disclosure may not be so limiting and may be applicable to other structures, such as, but not limited to, a circular structure, a square structure, or a curved profile.

The first speaker grille 110 may be perforated to have a first hole pattern 110b which may include a uniform or a non-uniform distribution of holes on a surface of the first speaker grille 110. Such distribution may be characterized by a hole size 110c and/or a center-to-center distance 110d between two neighboring holes on the surface of the first speaker grille 110. The variation in the first hole pattern 110b may affect the diffusion of the cleaning fluid 120 through the first speaker grille 110. Based on the distribution (or a density) of the hole size 110c and the center-to-center distance 110d of the first hole pattern 110b, the diffusion of droplets of the cleaning fluid 120 from the first speaker grille 110 towards the pressure plate 106 may vary. For example, the first hole pattern 110b of the first speaker grille 110 may have a first hole size between 9 mm and 11 mm and a first center-to-center distance between 14 mm and 17 mm, and if the first speaker grille 110 is replaced by a second speaker grille 310 (as shown in FIG. 3) with a second hole size of between 5 mm and 7 mm and a second center-to-center distance between 8 mm and 11 mm, the cleaning fluid 120 may diffuse through the second speaker grille to strike the pressure plate 106 at a pressure that may be less than a pressure at which the diffused cleaning fluid 120 from the first speaker grille may strike the pressure plate 106. The cleaning fluid 120 may encounter more resistance from the second speaker grille as compared to the first speaker grille 110.

Figure 2:
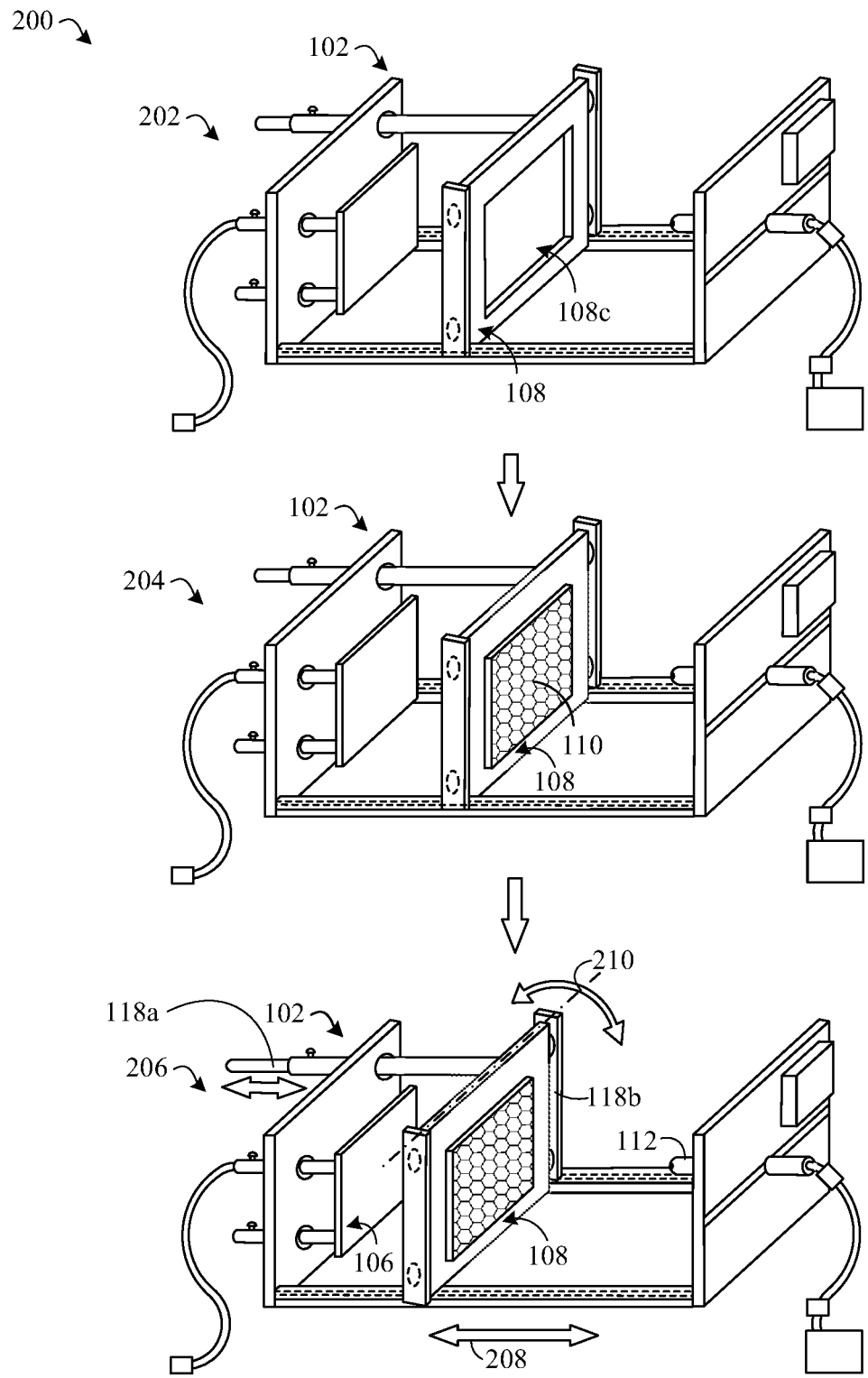
FIG. 2 is a diagram that illustrates exemplary stages of operations to achieve an exemplary arrangement of a speaker grille on a grille mounting plate of the exemplary test apparatus of FIG. 1, in accordance with an embodiment of the disclosure.

FIG. 2 is a diagram that illustrates exemplary stages of operations to achieve an exemplary arrangement of a speaker grille on a grille mounting plate of the exemplary test apparatus of FIG. 1, in accordance with an embodiment of the disclosure. FIG. 2 is explained in conjunction with elements from FIG. 1. With reference to FIG. 2, there is shown a diagram 200 of exemplary stages of operations, such as a placement stage 202, a mount stage 204, and an adjustment stage 206.

In the placement stage 202, the grille cut-out 108c of the grille mounting plate 108 may receive a speaker grille (such as the first speaker grille 110). For example, the grille cut-out 108c may have the substantially rectangular structure to align with the substantially rectangular structure of the first speaker grille 110.

In the mount stage 204, the first speaker grille 110 may be mounted on the grille cut-out 108c of the grille mounting plate 108.

In the adjustment stage 206, the placement of the grille mounting plate 108 may be calibrated with respect to a position of the nozzle 112 and a position of the pressure plate 106. For instance, the adjustable support structure 118 may be configured to calibrate the position 208 and the relative orientation 210 of the grille mounting plate 108. In at least one embodiment, the distance-adjustment mechanism 118a of the adjustable support structure 118 may be configured to adjust the first distance 108a between the grille mounting plate 108 and the pressure plate 106. Also, the distance-adjustment mechanism 118a may be configured to adjust the second distance 108b between the grille mounting plate 108 and the nozzle 112. In at least one embodiment, the angle-adjustment mechanism 118b may be configured to adjust the relative orientation 210 of the grille mounting plate 108 with the pressure plate 106. Additionally, the angle-adjustment mechanism 118b may be configured to adjust the relative orientation 210 of the grille mounting plate 108 with the nozzle 112.

The diagram 200 is illustrated as discrete stages of operations, such as the placement stage 202, the mount stage 204, and the adjustment stage 206. However, in certain embodiments, such discrete stages of operations may be further divided into additional stages or operations, combined into fewer stages or operations, or eliminated, depending on the implementation without detracting from the essence of the disclosed embodiments.

FIG. 3 is a diagram that illustrates exemplary stages of operations for a power-wash test of a speaker grille using the exemplary test apparatus of FIG. 1, in accordance with an embodiment of the disclosure. FIG. 3 is explained in conjunction with elements from FIG. 1 and FIG. 2. With reference to FIG. 3, there is shown a diagram 300 that illustrates exemplary stages of operations, such as a first stage 302 and a second stage 304. The exemplary stages of operations may be performed after the adjustment stage 206 of FIG. 2.

In the first stage 302, the power-wash test for the first speaker grille 110 may be initialized. The fluid release mechanism 104 may be activated to release the cleaning fluid 120 at the first pressure (for example, 8 MPa or 12-13 liters/minute) through the nozzle 112 and towards the first speaker grille 110. In an embodiment, the fluid release mechanism may be controlled to set one or more of the spray pattern, the first pressure, the fluid velocity, or the fluid volume of the released cleaning fluid 120. For example, the actuator 104a of the fluid release mechanism 104 may control the pump 104b to draw the cleaning fluid 120 from the fluid reservoir 104c and to transfer the cleaning fluid 120 to the nozzle 112. The nozzle 112 may be configured to release the cleaning fluid 120 as a spray pattern at the first pressure. The first pressure may be determined by the pressure gauge 104d and may be calibrated by an electronic control valve (such as a proportional control solenoid valve) or a mechanical control valve. When the first speaker grille 110 receives the released cleaning fluid 120, the first hole pattern 110b of the first speaker grille 110 may diffuse the released cleaning fluid 120, causing the diffused cleaning fluid 120 to strike the pressure plate 106 at the second pressure. The pressure sensor 106a coupled to the pressure plate 106 may be configured to record the second pressure.

In at least one embodiment, the gantry 114 may be controlled. The gantry 114 may be disposed substantially parallel to the grille mounting plate 108 and slidably coupled to the nozzle 112. When the gantry 114 is controlled, the gantry 114 may linearly slide the nozzle 112 (or reciprocally slide the nozzle 112) in the direction 306 at a first speed so that the released cleaning fluid 120 reaches multiple regions or the entire area 110a of the first speaker grille 110 mounted on the grille mounting plate 108 and then diffuses through the first speaker grille 110 to strike onto the pressure plate 106. In an embodiment, the cleaning fluid 120 may be a water spray, which may diffuse through the first speaker grille 110 to strike the pressure plate 106.

In at least one embodiment, the adjustable support structure 118 may be configured to calibrate the position 208 and the relative orientation 210 of the grille mounting plate 108 in order to ensure that the second pressure remains less than or equal to the threshold pressure. Based on whether the recorded second pressure is less than or equal to the threshold pressure, information associated with position of the grille mounting plate 108 (such as the first distance 108a and the second distance 108b), the relative orientation 210 of the grille mounting plate 108, the first pressure (recorded by the pressure gauge 104d), the second pressure (recorded by the pressure sensor 106a), the spray pattern, the fluid volume, or and the fluid velocity may be recorded as a passing specification for the first speaker grille 110. In one embodiment, the recording device 104e may be configured to record such information.

In the second stage 304, the first speaker grille 110 with the first hole pattern 110b may be replaced by a second speaker grille 310 with a second hole pattern 310a based on a determination that the recorded second pressure exceeds the threshold pressure. The second hole pattern 310a may have a decreased hole diameter as compared to that of the first hole pattern 110b. The second hole pattern 310a may diffuse the released cleaning fluid 120, causing the diffused cleaning fluid 120 to strike the pressure plate 106 at a third pressure. The pressure sensor 106a may be configured to record the third pressure. As the second hole pattern 310a has a decreased hole diameter as compared to the first hole pattern 110b, the recorded third pressure may be less than the recorded second pressure. This may help to bring a pressure of the diffused cleaning fluid 120 below the threshold pressure in case the second pressure exceeds the threshold pressure.

The diagram 300 is illustrated as discrete stages of operations, such as the first stage 302 and the second stage 304. However, in certain embodiments, such discrete stages of operations may be further divided into additional operations, combined into fewer operations, or eliminated, depending on the implementation without detracting from the essence of the disclosed embodiments.

Figure 4:
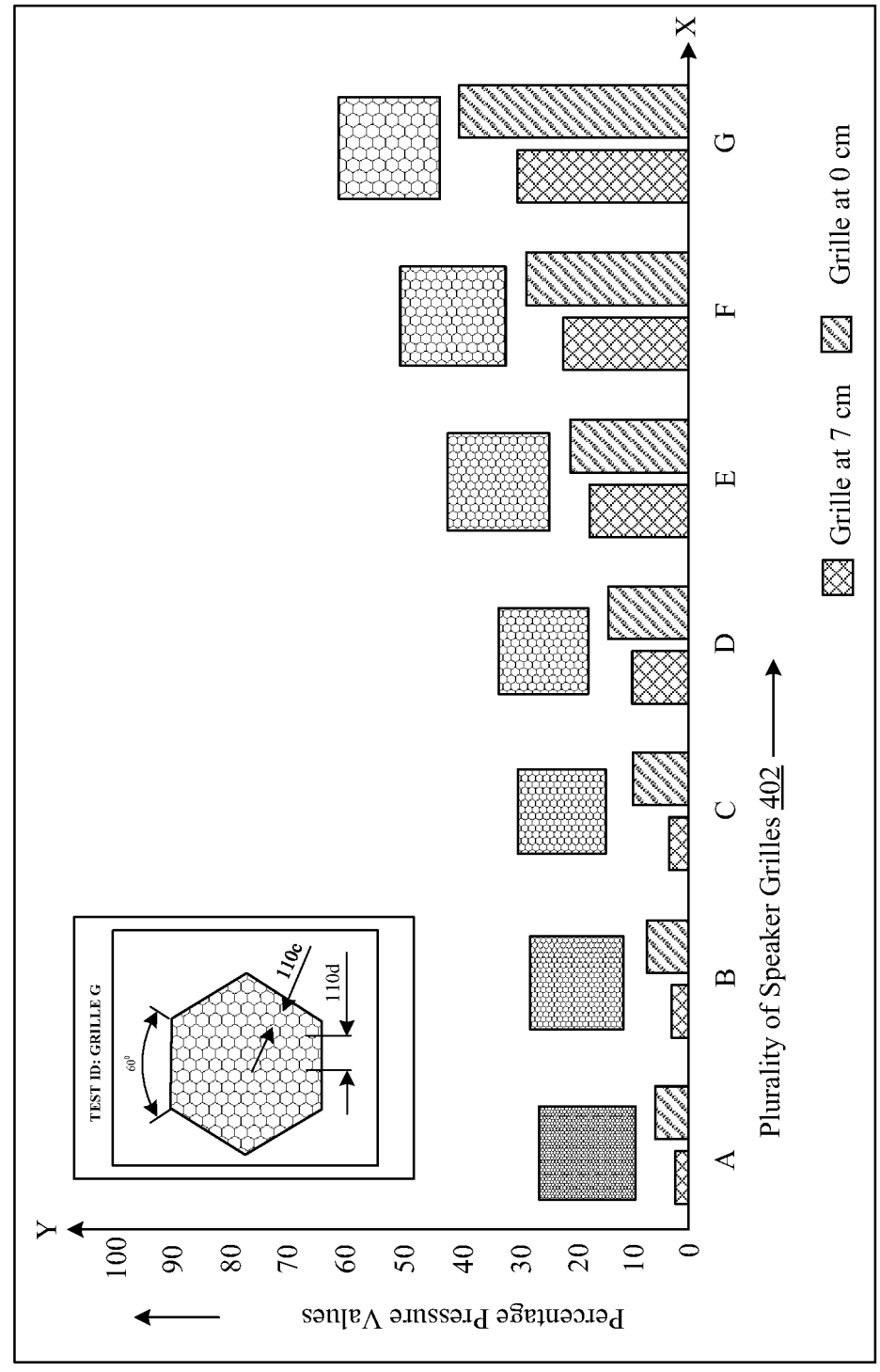
FIG. 4 is a graph that illustrates a variation in a pressure of a diffused cleaning fluid on a pressure plate with a variation of speaker grilles, in accordance with an embodiment of the disclosure.

FIG. 4 is a graph that illustrates a variation in a pressure of a diffused cleaning fluid 120 on a pressure plate with a variation of speaker grilles, in accordance with an embodiment of the disclosure. FIG. 4 is explained in conjunction with elements from FIGS. 1, 2, and 3. With reference to FIG. 4, there is shown a graph 400 that illustrates percentage pressure values of the diffused cleaning fluid 120 on the pressure plate 106 along the Y-axis for a plurality of speaker grilles 402 along the X-axis. The plurality of speaker grilles 402 may include a grille A, a grille B, a grille C, a grille D, a grille E, a grille F, and a grille G.

The plurality of speaker grilles 402 from the grille A to the grille G may be arranged on the X-axis in an increasing order of hole densities. For example, the plurality of speaker grilles 402 from the grille A to the grille G may be arranged on the X-axis in an increasing order of hole sizes and an increasing order of center-to-center distances. For example, the hole size and the center-to-center distance for each of the plurality of speaker grilles 402 may be provided in Table 1, as follows:

TABLE 1

Hole densities of the plurality of speaker grilles 402

| Grille Pattern | Hole Size (mm) | Center-To-Center Distance (mm) |
|---|---|---|
| Grille A | 0-1 | 0-2 |
| Grille B | 1-3 | 2-5 |
| Grille C | 3-5 | 5-8 |
| Grille D | 5-7 | 8-11 |
| Grille E | 7-9 | 11-14 |
| Grille F | 9-11 | 14-17 |
| Grille G | 11-13 | 17-20 |

The variation in the pressure may be measured under two scenarios, such as, a first scenario and a second scenario. In first scenario, the pressure plate 106 may be separated from a speaker grille (i.e., one of the plurality of the speaker grilles 402) that may be mounted on the grille mounting plate 108 at 7 cm. Further, the pressure plate 106 may be separated from the nozzle 112 at 30 cm. The fluid release mechanism 104 may then be activated to perform the power-wash test. During the power-wash test, the cleaning fluid 120 may be released from the nozzle 112 at the first pressure of 1000 PSI towards the speaker grille that may be mounted on the grille mounting plate 108. The hole pattern of the speaker grille may diffuse the cleaning fluid 120, causing the diffused cleaning fluid 120 to strike the pressure plate 106 at the second pressure. For each speaker grille, the second pressure may depend on at least one of its hole size and its center-to-center distance if the separation between the pressure plate 106 and the nozzle 112 and the separation between the pressure plate 106 and the speaker grille remains constant. For example, in case the separation between the pressure plate 106 and the nozzle 112 is 30 cm and the separation between the pressure plate 106 and the speaker grille is 7 cm, the second pressure may depend on the hole size and the center-to-center distance of the speaker grille (i.e., one of the plurality of speaker grilles 402).

In the second scenario, there may not be any separation between the pressure plate 106 and the speaker grille that may be mounted on the grille mounting plate 108 (i.e., a separation of 0 cm). But, the pressure plate 106 may be separated from the nozzle 112 at 30 cm. The fluid release mechanism 104 may then be activated to perform the power-wash test. During the power-wash test, the cleaning fluid 120 may be released from the nozzle 112 at the first pressure of 1000 PSI towards the speaker grille (i.e., one of the plurality of speaker grilles 402). The hole pattern of the speaker grille may diffuse the cleaning fluid 120, causing the diffused cleaning fluid 120 to strike the pressure plate 106 at the second pressure. For each speaker grille, the second pressure may depend on at least one of its hole size and its center-to-center distance if the separation between the pressure plate 106 and the nozzle 112 and the separation between the pressure plate 106 and the speaker grille remains constant. For example, in case the separation between the pressure plate 106 and the nozzle 112 is 30 cm and the separation between the pressure plate 106 and the speaker grille is 0 cm, the second pressure may depend on the hole size and the center-to-center distance of the speaker grille (i.e., one of the plurality of speaker grilles 402). Based on the graph 400, a set of percentage pressure values of the diffused cleaning fluid 120 for the plurality of speaker grilles 402 for the first scenario and the second scenario may be provided in Table 2, as follows:

TABLE 2

Percentage of the variation in pressure

| Grille Pattern | First Scenario Variation in Pressure | Second Pressure (PSI) | Second Scenario Variation in Pressure | Second Pressure (PSI) |
|---|---|---|---|---|
| Grille A | 2% | 20 | 7% | 70 |
| Grille B | 3% | 30 | 8% | 80 |
| Grille C | 5% | 50 | 10% | 10 |
| Grille D | 10% | 100 | 13% | 130 |
| Grille E | 19% | 190 | 20% | 200 |
| Grille F | 22% | 220 | 28% | 280 |
| Grille G | 30% | 300 | 41% | 410 |

From the Table 2, it may be determined that the pressure percentage value for each of the grille A, the grille B, the grille C, and the grille D is less than 15% of the first pressure (i.e., 1000 PSI) of the cleaning fluid 120 that may be released from the nozzle 112. It may also be determined that the pressure percentage value for each of the grille E, the grille F, and the grille G is greater than 15% of the first pressure (i.e., 1000 PSI) of the cleaning fluid 120 that may be released from the nozzle 112. For a threshold pressure percentage of 15%, power-wash test results for the plurality of speaker grilles 402 for the first scenario and the second scenario may be provided in Table 3, as follows:

TABLE 3

Power-wash test results

| Grille Pattern | First Scenario Power-Wash Test Result | Second Scenario Power-Wash Test Result |
| --- | --- | --- |
| Grille A | OK | OK |
| Grille B | OK | OK |
| Grille C | OK | OK |
| Grille D | OK | OK |
| Grille E | Not Good | Not Good |
| Grille F | Not Good | Not Good |
| Grille G | Not Good | Not Good |

From the Table 3, it may be determined that the grille A, the grille B, the grille C, and the grille D passes the power-wash test, while the grille E, the grille F, and the grille G fails the power-wash test. Based on the comparison between the table 2 and the table 3, it may be observed that in order to pass the power-wash test, the variation in pressure on the pressure plate 106 should be equal to or less than 15% (i.e., 150 PSI) of the first pressure (i.e., 1000 PSI).

From Table 2, it may also be determined that in case the first distance from the speaker grille to the pressure plate 106 is 7 cm, the percentage pressure value is less than when the first distance is 0 cm. Therefore, the first distance of 7 cm may be considered a safe distance value for a power-wash test. The first distance of the first scenario may also be recorded as a passing specification to execute the power-wash of the speaker driver. Based on Table 1 to Table 3, passing specifications may be prepared, as shown, for example, in Table 4.

TABLE 4

Passing specifications for the power-wash test

| Grille Pattern | Hole Size (mm) | Center-To-Center (mm) | First Distance (cm) | Second Distance (cm) | Threshold Pressure (PSI) |
| --- | --- | --- | --- | --- | --- |
| Grille A | 0-1 | 0-2 | 7 | 23 | 150 |
| Grille B | 1-3 | 2-5 | 7 | 23 | 150 |
| Grille C | 3-5 | 5-8 | 7 | 23 | 150 |
| Grille D | 5-7 | 8-11 | 7 | 23 | 150 |

Based on the passing specifications of Table 4, the power wash may be performed on the speaker driver of the speaker. For example, using Table 4, the grille A may be selected for the speaker driver. The test apparatus may be used to setup the speaker driver (in place of the pressure plate 106) and the selected speaker grille in an optimal arrangement based on the passing specification of Table 4 for the grille A. The fluid release mechanism 104 may be configured to perform the power washing of the speaker driver based on the passing specification for the grille A, without causing any damage to the speaker driver.

Figure 5:
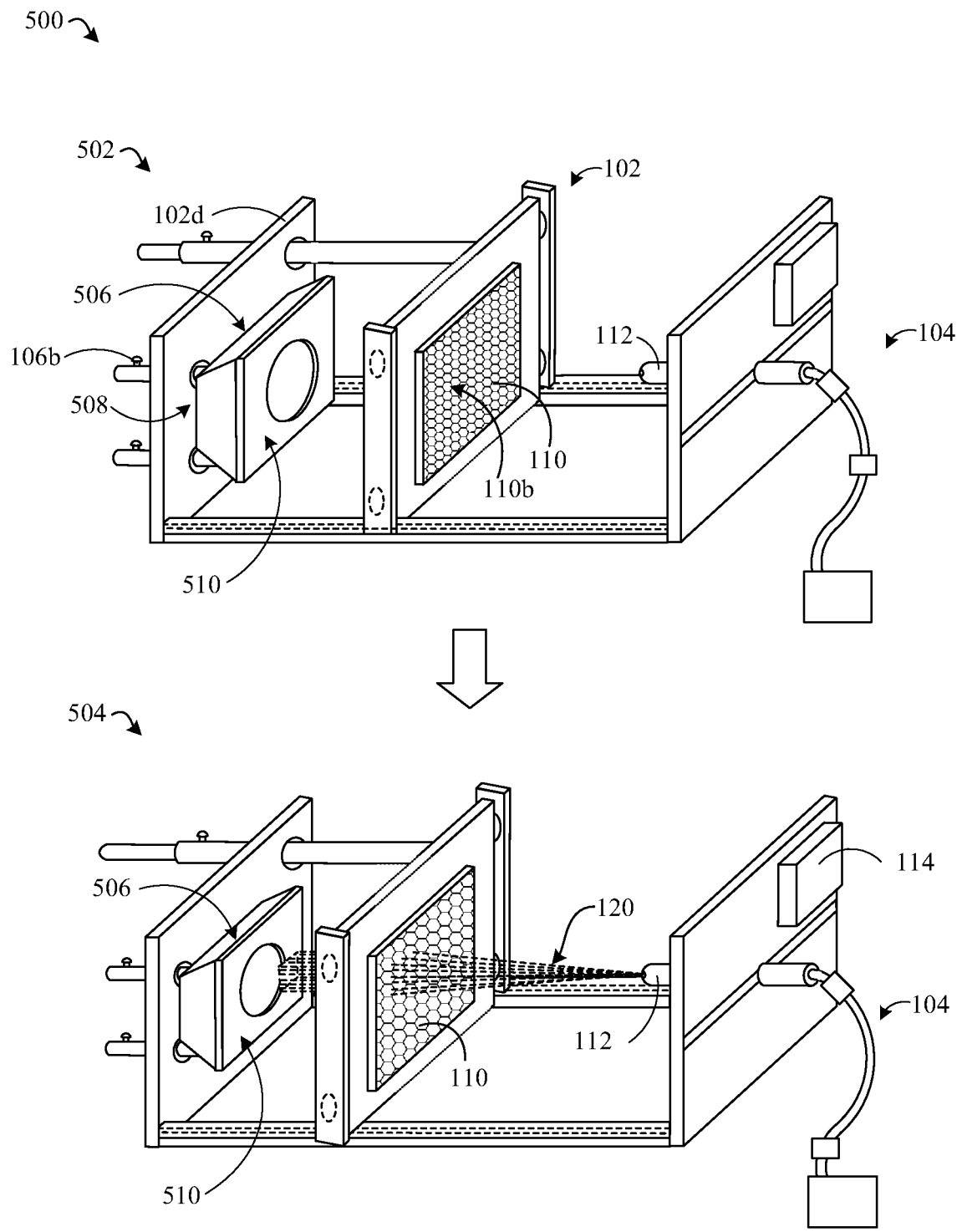
FIG. 5 is a diagram that illustrates exemplary stages of operations for a power-wash of a speaker driver, in accordance with an embodiment of the disclosure.

FIG. 5 is a diagram that illustrates exemplary stages of operations for a power-wash of a speaker driver, in accordance with an embodiment of the disclosure. FIG. 5 is explained in conjunction with elements from FIG. 1, FIG. 2, FIG. 3, and FIG. 4. With reference to FIG. 5, there is shown a diagram 500 that includes two stages, such as a mount stage 502 and a wash stage 504. The mount stage 502 may be initialized after the first stage 302 or after the second stage 304 of FIG. 3.

In the mount stage 502, the fastening element 106b may be released from the first wall 102d of test apparatus 102 to remove the pressure plate 106 from the first wall 102d of the base 102a. The pressure plate 106 may be replaced by a speaker driver 506 based on whether the recorded second pressure is less than or equal to the threshold pressure. Upon removal of the pressure plate 106 from the first wall 102d, the speaker driver 506 may be configured to replace a position 508 of the pressure plate 106 on the test apparatus 102.

The speaker driver 506 may be firmly affixed to the first wall 102d through the fastening element 106b so that a face of the speaker driver 506 is substantially parallel to the first speaker grille 110. In at least one embodiment, the first distance 108a between the first speaker grille 110 and the speaker driver 506, the second distance 108b between the first speaker grille 110 and the nozzle 112 may be adjusted based on a passing specification for the first speaker grille 110 (as obtained in FIG. 4, for example). For example, the first distance 108a and the second distance 108b may be adjusted by horizontally moving the first speaker grille 110 towards or away from the nozzle 112.

In the wash stage 504, the power-wash of the speaker driver 506 may be initialized. The fluid release mechanism 104 may be activated to release the cleaning fluid 120 at the first pressure through the nozzle 112 and towards the first speaker grille 110 after the pressure plate 106 is replaced. The first hole pattern 110b of the first speaker grille 110 may diffuse the released cleaning fluid 120, causing the diffused cleaning fluid 120 to strike an exposed surface 510 of the speaker driver 506 so that the exposed surface 510 may be cleaned without any damage to the speaker driver 506. While releasing the cleaning fluid 120, the first pressure, the fluid volume, the fluid velocity, and the spray pattern of the released cleaning fluid 120 may be controlled based on the passing specification for the first speaker grille 110. During the power-wash, the diffused cleaning fluid 120 may clean dust particles that may have accumulated on the first speaker grille 110 or on the exposed surface 510 of the speaker driver 506.

Figure 6:
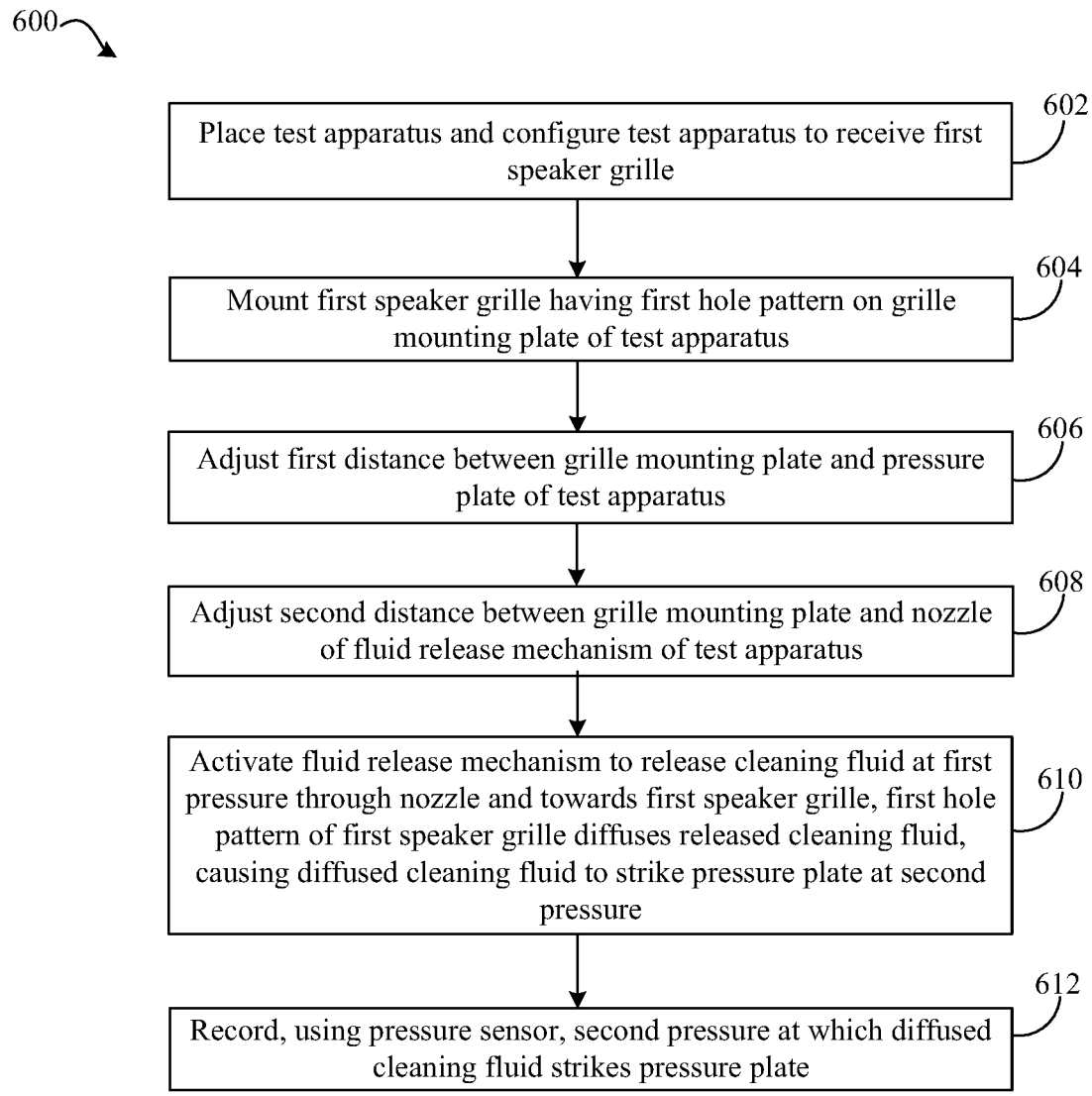
FIG. 6 is a flowchart that illustrates an exemplary method to perform a power-wash test for a speaker driver, in accordance with an embodiment of the disclosure.

FIG. 6 is a flowchart that illustrates an exemplary method to perform a power-wash test for a speaker driver, in accordance with an embodiment of the disclosure. FIG. 6 is explained in conjunction with elements from FIGS. 1, 2, 3, 4, 5, and 6. With reference to FIG. 6, there is shown a flowchart 600 that depicts an exemplary method to perform the power-wash test for the first speaker grille 110 using the test apparatus 102 of FIG. 1. The method illustrated in the flowchart 600 may start at 602.

At 602, the test apparatus 102 may be placed and configured to receive the first speaker grille 110. The test apparatus 102 may include fluid release mechanism 104, the pressure plate 106 coupled to the pressure sensor 106a, and the grille mounting plate 108 that may be disposed between the nozzle 112 of the fluid release mechanism 104 and the pressure plate 106.

At 604, the first speaker grille 110 may be mounted on the grille mounting plate 108. The first speaker grille 110 may have the first hole pattern 110b. At 606, the first distance 108a between the grille mounting plate 108 and the pressure plate 106 may be adjusted. At 608, the second distance 108b between the grille mounting plate 108 and the nozzle 112 may be adjusted.

At 610, the fluid release mechanism 104 may be configured to be activated to release the cleaning fluid 120 at the first pressure through the nozzle 112 and towards the first speaker grille 110. The first hole pattern 110b may diffuse the released cleaning fluid 120, causing the diffused cleaning fluid 120 to strike the pressure plate 106 at the second pressure.

At 612, the second pressure at which the diffused cleaning fluid 120 may strike the pressure plate 106 may be recorded. For example, the pressure sensor 106a may be configured to record the second pressure.

The flowchart 600 is illustrated as discrete operations, such as 602, 604, 606, 608, 610, and 612. However, in certain embodiments, such discrete operations may be further divided into additional operations, combined into fewer operations, or eliminated, depending on the implementation without detracting from the essence of the disclosed embodiments.

For the purposes of the present disclosure, expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible considering the above teachings. Some of those modifications have been discussed and others will be understood by those skilled in the art. The embodiments were chosen and described for illustration of various embodiments. The scope is, of course, not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

What is claimed is:

1. A method, comprising:
   placing a test apparatus comprising:
   a fluid release mechanism comprising a nozzle;
   a pressure plate coupled to a pressure sensor; and
   a grille mounting plate disposed between the nozzle and the pressure plate;
   mounting a first speaker grille having a first hole pattern on the grille mounting plate;
   adjusting a first distance between the grille mounting plate and the pressure plate;
   adjusting a second distance between the grille mounting plate and the nozzle;
   activating the fluid release mechanism to release a cleaning fluid at a first pressure through the nozzle and towards the first speaker grille, the first hole pattern diffuses the released cleaning fluid, causing the diffused cleaning fluid to strike the pressure plate at a second pressure; and
   recording, using the pressure sensor, the second pressure at which the diffused cleaning fluid strikes the pressure plate.

2. The method according to claim 1, further comprising setting a relative orientation of the grille mounting plate with the pressure plate.

3. The method according to claim 1, wherein the first distance and the second distance are adjusted by horizontally moving the grille mounting plate.

4. The method according to claim 1, wherein the activating further comprises controlling the fluid release mechanism to set at least one of: a spray pattern, the first pressure, or a fluid velocity of the released cleaning fluid from the nozzle.

5. The method according to claim 1, wherein the activating further comprises activating a gantry disposed substantially parallel to the grille mounting plate and slidably coupled to the nozzle, to linearly slide the nozzle at a first speed so that the released cleaning fluid reaches an entire area of the first speaker grille mounted on the grille mounting plate.

6. The method according to claim 1, further comprising replacing the first speaker grille by a second speaker grille having a second hole pattern based on whether the recorded second pressure exceeds a threshold pressure.

7. The method according to claim 1, further comprising adjusting at least one of: a relative orientation of the grille mounting plate with the pressure plate, the first distance, the second distance, or the first pressure based on whether the recorded second pressure exceeds a threshold pressure.

8. The method according to claim 1, further comprising recording information associated with the first speaker grille, the first distance, the second distance, the first pressure, and the second pressure as a passing specification.

9. The method according to claim 8, further comprising:
   replacing the pressure plate by a speaker driver based on whether the recorded second pressure is less than or equal to a threshold pressure; and
   activating the fluid release mechanism for releasing the cleaning fluid at the first pressure through the nozzle and towards the first speaker grille after the pressure plate is replaced,
   wherein the first hole pattern of the first speaker grille diffuses the released cleaning fluid, causing the diffused cleaning fluid to strike an exposed surface of the speaker driver so that the exposed surface is cleaned without a damage to the speaker driver.

10. A test apparatus, comprising:
    a fluid release mechanism comprising a nozzle;
    a pressure plate coupled to a pressure sensor; and
    a grille mounting plate disposed between the nozzle and the pressure plate at a first distance from the pressure plate and a second distance from the nozzle,
    wherein when activated, the fluid release mechanism is configured to release a cleaning fluid at a first pressure through the nozzle and towards a first speaker grille mounted on the grille mounting plate, and
    wherein the first speaker grille comprises a first hole pattern which diffuses the released cleaning fluid, causing the diffused cleaning fluid to strike the pressure plate at a second pressure, and the pressure sensor is configured to record the second pressure when the diffused cleaning fluid strikes the pressure plate.

11. The test apparatus according to claim 10, further comprising a base having a first wall that extends substantially perpendicular from a first end of the base, wherein the first wall is configured to hold an adjustable support structure coupled to an end of the grille mounting plate.

12. The test apparatus according to claim 11, wherein the adjustable support structure comprises:

a distance-adjustment mechanism to set the first distance between the grille mounting plate and the pressure plate, and an angle-adjustment mechanism to set a relative orientation of the grille mounting plate with the pressure plate.

13. The test apparatus according to claim 10, wherein, when activated, the fluid release mechanism is configured to control at least one of: a spray pattern, the first pressure, or a fluid velocity of the released cleaning fluid from the nozzle.

14. The test apparatus according to claim 10, further comprising a gantry that is disposed substantially parallel to the grille mounting plate and is slidably coupled to the nozzle of the fluid release mechanism, wherein when the fluid release mechanism is activated, the gantry is configured to reciprocally slide the nozzle at a first speed so that the released cleaning fluid reaches multiple regions of the first speaker grille mounted on the grille mounting plate.

15. The test apparatus according to claim 10, wherein the pressure plate is disposed substantially parallel to the grille mounting plate at the first distance.

16. The test apparatus according to claim 10, wherein the nozzle of the fluid release mechanism is disposed substantially perpendicular to the grille mounting plate at the second distance.

17. The test apparatus according to claim 10, wherein the fluid release mechanism is a pressure washing device that releases a water spray as the cleaning fluid.

18. The test apparatus according to claim 10, further comprising a recording device configured to record information associated with the first speaker grille, the first distance, the second distance, the first pressure, and the second pressure as a passing specification.

19. The test apparatus according to claim 10, wherein the pressure plate is configured to be replaced by a speaker driver based on whether the recorded second pressure is less than or equal to a threshold pressure.

20. The test apparatus according to claim 19, wherein the fluid release mechanism is further controlled to release the cleaning fluid at the first pressure through the nozzle and towards the first speaker grille when the speaker driver is mounted at a position of the pressure plate, and the first hole pattern of the first speaker grille diffuses the released cleaning fluid causing the diffused cleaning fluid to strike an exposed surface of the speaker driver at the second pressure so that the exposed surface is cleaned without a damage to the speaker driver.

* * * * *